United States Patent [19]

Yanagisawa

[11] Patent Number: 5,499,552

[45] Date of Patent: Mar. 19, 1996

[54] TWO DIMENSIONAL DRIVE SYSTEM

[76] Inventor: Ken Yanagisawa, c/o Kabushiki Kaisha Mechanic Sekkei Jimusho, 5175-1, Ooaza Toyoshina, Toyoshina-machi, Minamiazumi-gun, Nagano-ken, Japan

[21] Appl. No.: 59,363

[22] Filed: May 11, 1993

[30]     Foreign Application Priority Data

May 15, 1992   [JP]   Japan .................................. 4-148565

[51] Int. Cl.$^6$ ............................ B23Q 1/18; G05G 11/00; F16H 19/06

[52] U.S. Cl. ..................... 74/471 XY; 74/89.22; 184/15.1

[58] Field of Search ................ 74/89.15, 89.22, 74/471 XY, 479 PH; 184/7.1, 15.1, 11.2

[56]              References Cited

U.S. PATENT DOCUMENTS 4,572,332   2/1986   Pool ......................... 184/15.1
4,995,277   2/1991   Yanagisawa ................. 74/479 PH

*Primary Examiner*—Rodney H. Bonck
*Assistant Examiner*—David Fenstermacher

[57]              ABSTRACT

In the two dimensional drive system of the present invention, four corner blocks are respectively provided at each corner of a rectangular plane, which is enclosed by the first looped members arranged in a first direction and the second looped members arranged in a second direction perpendicular to the first direction. Four guide pipes are spanned between two adjacent the corner blocks. Both ends of each guide pipe are opened. Four connecting shafts are respectively pierced through the guide pipes. Piercing the connecting shafts through the guide pipes, bending of the connecting shafts and increasing of load can be prevented.

12 Claims, 3 Drawing Sheets

TWO DIMENSIONAL DRIVE SYSTEM

BACKGROUND OF THE INVENTION

The present invention relates to a two dimensional drive system, more precisely relates to a two dimensional drive system, which is capable of moving a moving body on a cross point of a couple of shafts by looped members.

An example of conventional two dimensional drive systems having looped members for driving a moving body is disclosed in the U.S. Pat. No. 4,995,277.

In FIG. 3 of the drawing which is prior art, X-belts 100a and 100b are capable of running in an X-direction; Y-belts 102a and 102b are capable of running in a Y-direction perpendicular to the X-direction. The X-belts 100a and 100b are run in the X-direction by a mechanism including a connecting shaft 106a for connecting pulleys 104a and 104b, a connecting shaft 106b for connecting pulleys 104c and 104d, and a motor 108a for rotating the connecting shaft 106a. On the other hand, the Y-belts 102a and 102b are run in the Y-direction by a mechanism including a connecting shaft 106c for connecting pulleys 104e and 104f, a connecting shaft 106d for connecting pulleys 104g and 104h, and a motor 108b for rotating the connecting shaft 106c.

X-moving blocks 110a and 110b are respectively attached to the X-belts 100a and 100b. The X-moving blocks 110a and 110b are capable of moving along X-linear guides 114a and 114b, which are provided on a rectangular frame 112. Y-moving blocks 116a and 116b are respectively attached to the Y-belts 102a and 102b. The Y-moving blocks 116a and 116b are capable of moving along Y-linear guides 118a and 118b, which are provided on the rectangular frame 112.

A moving body 120 is capable of moving on a shaft 122a, whose ends are fixed to the X-moving blocks 110a and 110b, and on a shaft 122b, whose ends are fixed to the Y-moving blocks 116a and 116b. A moving body 120 can be moved in the X-Y directions by running the X-belts 100a and 100b and the Y-belts 102a and 102b.

However, the conventional two dimensional drive system has the following disadvantage.

In the conventional one, as shown in FIG. 3, the connecting shafts 106a, 106b, 106c and 106d are rotatably spanned between gear boxes 124, so that they may bend downward if they are long. If the connecting shafts 106a, 106b, 106c and 106d bend, load of the motors 108a and 108b becomes greater, and high speed movement of the moving body 120 is prevented.

SUMMARY OF THE INVENTION

An object of the present invention is to provide a two dimensional drive system, which is capable of preventing connecting shafts for connecting turning means from bending.

To achieve the object, the two dimensional drive system of the present invention has the following structures. A pair of first looped members are arranged in a first direction, and are capable of running in the first direction. A pair of second looped members are arranged in a second direction perpendicular to the first direction, and are capable of running in the second direction. Two first turning means for turning the first looped members are respectively engaged with each turning section thereof. Two second turning means for turning the second looped members are respectively engaged with each turning section thereof. Four corner blocks are respectively provided at each corner of a rectangular plane, which is enclosed by the first looped members and the second looped members, and each corner block accommodates the first turning means and the second turning means. Four guide pipes are spanned between two adjacent corner blocks and both ends of each guide pipe are opened. Four connecting shafts are respectively pierced through the guide pipes, and each connecting shaft connects a couple of first turning means or the second turning means. A couple of first moving blocks are respectively attached to the first looped members, and each first moving block is capable of moving in the first direction on each guide pipe. A couple of second moving blocks are respectively attached to the second looped members, and each second moving block is capable of moving in the second direction on each guide pipe. A first shaft is arranged in the second direction, and each end of the first shaft is connected to each first moving block. A second shaft is arranged in the first direction, and each end of the first shaft is connected to each second moving block. A moving body is capable of moving on the first shaft and the second shaft. First driving means runs the first looped members in the same direction at the same speed. And second driving means runs the second looped members in the same direction at the same speed.

In the two dimensional drive system of the present invention, the connecting shafts are respectively pierced through the guide pipes, which are respectively spanned between the adjacent corner blocks, so that bending of the connecting shafts can be prevented, and increasing of the load of the driving means can be prevented. Therefore, the moving body can be moved at high speed.

BRIEF DESCRIPTION OF THE DRAWINGS

An embodiment of the present invention will now be described by way of examples and with reference to the accompanying drawings, in which.

DETAILED DESCRIPTION OF A PREFERRED EMBODIMENT

A preferred embodiment of the present invention will now be described in detail with reference to the accompanying drawings.

Figure 1:
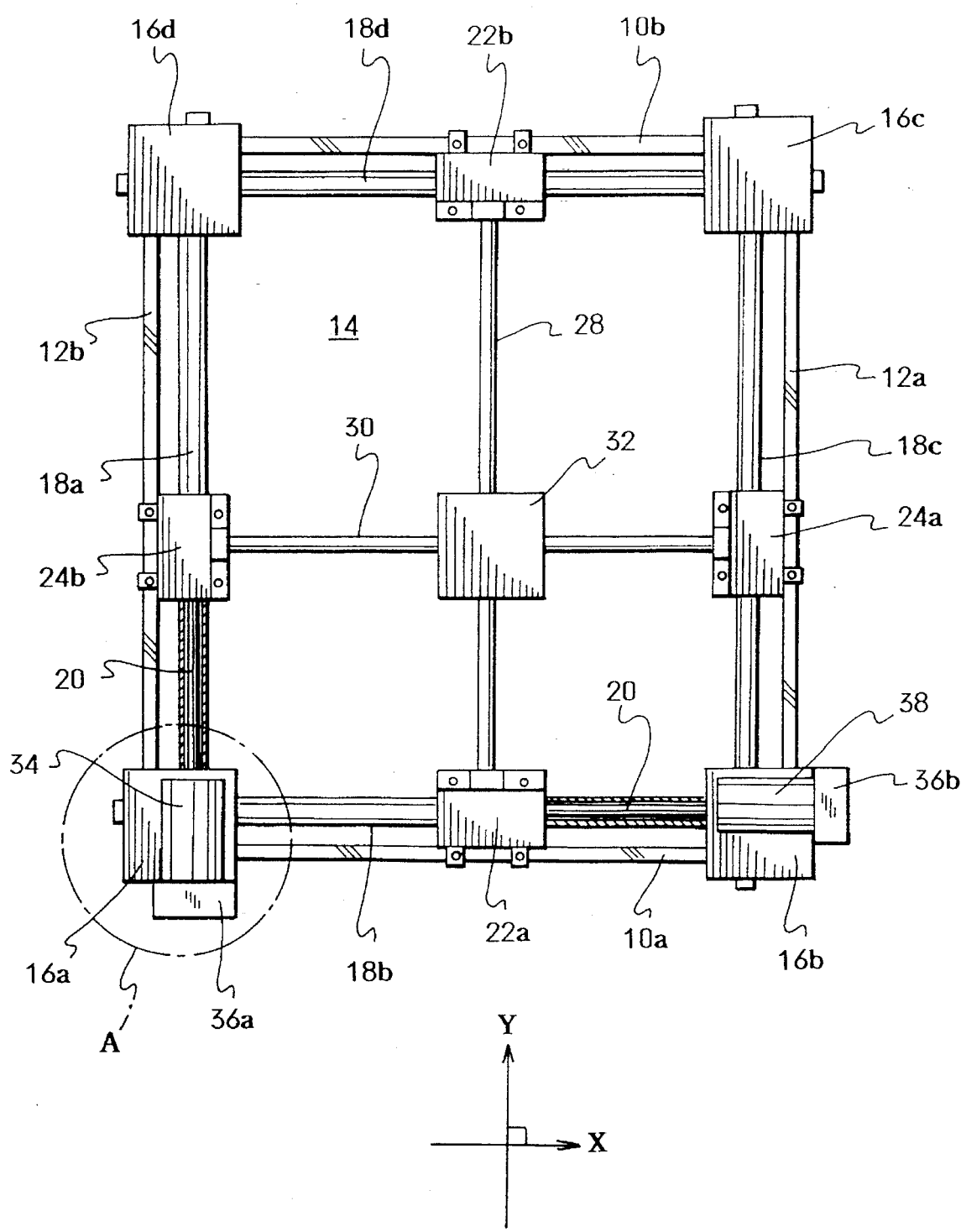
FIG. 1 is a plan view of a two dimensional drive system of an embodiment of the present invention.

Firstly, structures of a two dimensional drive system of the present embodiment will be explained with reference to FIG. 1.

X-belts 10a and 10b, which are an example of first looped members, are timing belts. The X-belts 10a and 10b are arranged in an X-direction, which is an example of a first direction, in parallel, and capable of running in the X-direction.

Y-belts 12a and 12b, which are an example of second looped members, are timing belts. The Y-belts 12a and 12b are arranged in a Y-direction, which is an example of a second direction, perpendicular to the X-direction, and capable of running in the Y-direction.

A rectangular plane 14 is enclosed with the X-belts 10a and 10b, and the Y-belts 12a and 12b.

Corner blocks 16a, 16b, 16c and 16d are respectively provided at each corner of the rectangular plane 14. Each corner block 16a, 16b, 16c or 16d includes a timing pulley 50a (see FIG. 2) for turning the X-belt 10a or 10b, and a timing pulley 50c (see FIG. 2) for turning the Y-belt 12a or 12b.

Guide pipes 18a, 18b, 18c and 18d are made of metal. Both ends of each guide pipe 18a, 18b, 18c or 18d are opened. Each guide pipe 18a, 18b, 18c or 18d is spanned between adjacent corner blocks 16a and 16b, 16b and 16c, 16c and 16d, or 16d and 16a. Ends of the guide pipes 18a, 18b, 18c or 18d are communicated with inner spaces of the corner blocks 16a, 16b, 16c and 16d.

Four connecting shafts 20 are made of metal. Each connecting shaft 20 is rotatably pierced through each guide pipe 18a, 18b, 18c and 18d. Each connecting shaft 20 connects a couple of pulleys 50a or a couple of pulleys 50c. By piercing the connecting shafts 20 through the guide pipes 18a, 18b, 18c and 18d, the connecting shafts 20 can be supported by inner faces of the guide pipes 18a, 18b, 18c and 18d. Thus, the connecting shafts 20 are restricted to overbend downward even if the connecting shafts 20 are long.

X-moving blocks 22a and 22b, which are an example of first moving blocks, are respectively attached to the X-belts 10a and 10b. The guide pipe 18b is pierced through the X-moving block 22a, so that the X-moving block 22a is capable of moving on the guide pipe 18b when the X-belt 10a runs. On the other hand, the guide pipe 18d is pierced through the X-moving block 22b, so that the X-moving block 22b is capable of moving on the guide pipe 18d when the X-belt 10b runs.

Y-moving blocks 24a and 24b, which are an example of second moving blocks, are respectively attached to the Y-belts 12a and 12b. The guide pipe 18c is pierced through the Y-moving block 24a, so that the Y-moving block 24a is capable of moving on the guide pipe 18c when the Y-belt 12a runs. On the other hand, the guide pipe 18a is pierced through the Y-moving block 24b, so that the Y-moving block 24b is capable of moving on the guide pipe 18a when the Y-belt 12b runs.

A first shaft 28 is made of metal. The first shaft 28 is arranged in the Y-direction. Each end of the first shaft 28 is respectively fixed to the X-moving blocks 22a and 22b.

A second shaft 30 is made of metal. The second shaft 30 is arranged in the X-direction. Each end of the second shaft 30 is respectively fixed to the Y-moving blocks 24a and 24b.

A slider 32, which is an example of moving bodies, is formed into a block shape. The first shaft 28 and the second shaft 30 are perpendicularly crossed in the slider 32. Thus, the slider 32 is capable of moving on the first shaft 28 and the second shaft 30. Tools, robot heads, measuring equipments, works, etc. can be mounted on or attached to the slider 32. The shape of the slider 32 is not limited to the cubical shape.

A first servo motor 34, which is an example of first driving means, runs the X-belts 10a and 10b in the same direction at the same speed with the connecting shafts 20 and the pulleys 50a. By the running of the X-belts 10a and 10b, the slider 32 is capable of moving in the X-direction. The first servo motor 34 is fixed to a casing 36a and placed above the corner block 16a. The first servo motor 34 is connected to the connecting shaft 20 by a timing belt 52 (see FIG. 2) in the casing 36a.

A second servo motor 38, which is an example of second driving means, runs the Y-belts 12a and 12b in the same direction at the same speed with the connecting shafts 20 and the pulleys 50c. By the running of the Y-belts 12a and 12b, the slider 32 is capable of moving in the Y-direction. The second servo motor 38 is fixed to a casing 36b and placed above the corner block 16b. The second servo motor 38 is connected to the connecting shaft 20 by the timing belt 52 in the casing 36b.

X-Y positions in the rectangular plane 14 can be defined by controlling the first servo motor 34 and the second servo motor 38.

Figure 2:
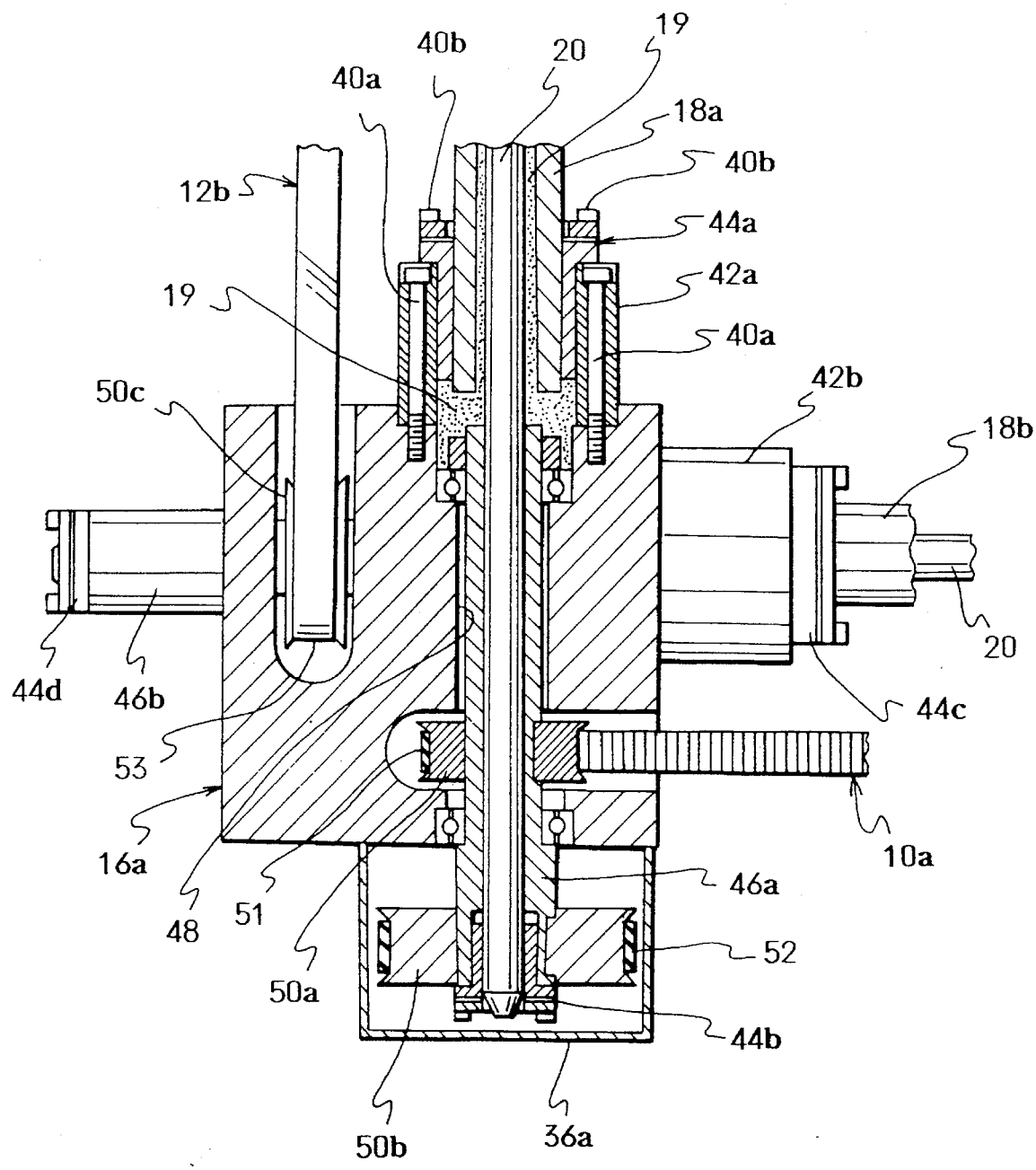
FIG. 2 is a plan sectional view of a part A in FIG. 1.

Successively, inner structures of the corner block 16a will be explained with reference to FIG. 2 (a plan sectional view of a part A in FIG. 1). Note that, other corner blocks 16b, 16c and 16d have the same inner structures, so their explanation will be omitted.

The corner block 16a is made of metal, e.g., aluminum, and formed into a cubical shape. There are engraved spaces required in the corner block 16a. An end section of the guide pipe 18a is fixed to a cylinder section 42a, which is fixed to the corner block 16a by bolts 40a. The guide pipe 18a and the cylinder section 42a are integrated by a coupler 44a. When bolts 40b are screwed into the coupler 44a, the coupler 44a tightly contacts an outer circumferential face of the guide pipe 18a and inner face of the cylinder section 42a, so that the the guide pipe 18a and the cylinder section 42a are integrally connected.

A rotatable cylinder 46a is rotatably provided in a through-hole 48, which is bored in the corner block 16a. The connecting shaft 20 is pierced through the guide pipe 18a and the rotatable cylinder 46a. An end section of the connecting shaft 20 is integrated with the rotatable cylinder 46a by a coupler 44b, whose structure is the same as the coupler 44a. Thus, the rotatable cylinder 46a can be rotated with the connecting shaft 20.

The timing pulley 50a, which is an example of first turning means, is fixed on an outer circumferential face of the rotatable cylinder 46a. The X-belt 10a is engaged with the pulley 50a, so that the X-belt 10a is turned the running direction at a left turning point 51.

A timing pulley 50b and a timing belt 52 constitute a mechanism for linking the first servo motor 34 and the connecting shaft 20. The timing belt 52 transmits rotary torque of the first servo motor 34 to the timing pulley 50b, the rotatable cylinder 46a and the connecting shaft 20. Thus, the X-belts 10a and 10b run in the X-direction when the rotary torque is transmitted. Note that, the timing pulley 50b and the timing belt 52 are accommodated in the casing 36a.

The guide pipe 18b is arranged below the guide pipe 18a, and fixed to a cylinder section 42b by a coupler 44c, whose structure is the same as the coupler 44a and 44b. The connecting shaft 20, which is pierced through the guide pipe 18b, is fixed to a rotatable cylinder 46b, whose structure is the same as the rotatable cylinder 46a, by a coupler 44d, whose structure is the same as the coupler 44a, 44b and 44c.

The timing pulley 50c, which is an example of second turning means, is fixed on an outer circumferential face of the rotatable cylinder 46b. The Y-belt 12b is engaged with the pulley 50c, so that the Y-belt 12b is turned the running direction at a lower turning point 53. When the second servo motor 38 is driven, the connecting shaft 20, which is pierced through the guide pipe 18b, and the pulley 50c are integrally rotated, so that the Y-belts 12a and 12b run in the Y-direction.

Note that, the guide pipes 18a, 18b, 18c and 18d are filled with lubricant 19, e.g., grease, so that abrasion and noise between the guide pipes 18a, 18b, 18c and 18d and the connecting shafts 20 are prevented.

Next, assembling steps of above described two dimensional drive system will be explained Firstly, the corner blocks 16a, 16b, 16c and 16d are set at predetermined positions. Secondly, the guide pipes 18a, 18b, 18c and 18d, through which the connecting shafts have been respectively pierced, are respectively spanned between the corner blocks 16a and 16b, 16b and 16c, 16c and 16d, and 16d and 16a. Afterwards rest elements are assembled. Thus, the two dimensional drive system can be assembled at a work site.

Figure 3:
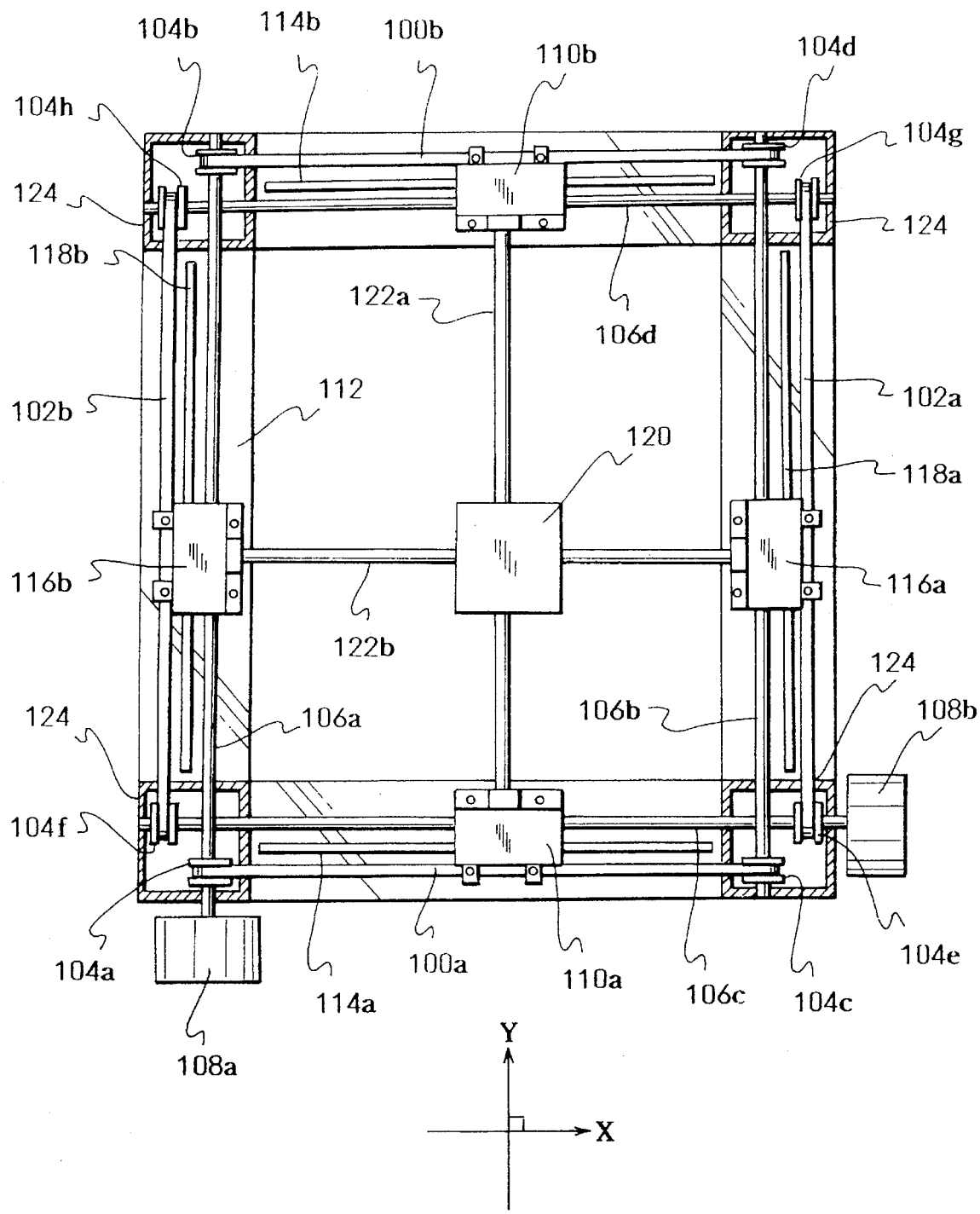
FIG. 3 is a plan view of a Prior Art two dimensional drive system.

In the present embodiment, the linear movement of the X-moving blocks 22a and 22b and the Y-moving blocks 24a and 24b is guided by the guide pipes 18a, 18b, 18c and 18d, so that the linear guides 114a, 114b, 114c and 114d (see FIG. 3), which are necessary elements in the conventional two dimensional drive system, can be omitted. Furthermore, the frame 112 for fixing the linear guides 114a, 114b, 114c and 114d, too, can be omitted in the embodiment. Therefore, in the present embodiment, the structure can be simpler, and manufacturing cost can be reduced.

Additionally, the connecting shafts 20 are pierced through the guide pipes 18a, 18b, 18c and 18d, so that number of elements exposed can be reduced and the system looks neat.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A two dimensional drive system, comprising:

a pair of first looped members being arranged in a first direction, said first looped members being capable of running in the first direction;

a pair of second looped members being arranged in a second direction perpendicular to the first direction, said second looped members being capable of running in the second direction;

two first turning means for turning said first looped members being respectively engaged with each turning section of said first looped members;

two second turning means for turning said second looped members being respectively engaged with each turning section of said second looped members;

four corner blocks being respectively provided at each corner of a rectangular plane, which is enclosed by said first looped members and said second looped members, each said corner block accommodating said first turning means and said second turning means;

four guide pipes being spanned between two adjacent said corner blocks, both ends of each said guide pipe being opened;

four connecting shafts being respectively pierced through said guide pipes, each said connecting shaft connects a couple of said first turning means or said second turning means;

a couple of first moving blocks being respectively attached to said first looped members, each said first moving block being capable of moving in the first direction on each said guide pipe;

a couple of second moving blocks being respectively attached to said second looped members, each said second moving block being capable of moving in the second direction on each said guide pipe;

a first shaft being arranged in the second direction, each end of said first shaft being connected to each said first moving block;

a second shaft being arranged in the first direction, each end of said first shaft being connected to each said second moving block;

a moving body being capable of moving on said first shaft and said second shaft;

first driving means for running said first looped members in the same direction at the same speed; and second driving means for running said second looped members in the same direction at the same speed.

2. The two dimensional drive system according to claim 1, wherein said guide pipes are filled with lubricant.

3. The two dimensional drive system according to claim 2, wherein said shafts are rotatable within the guide pipes.

4. The two dimensional drive system according to claim 3, wherein said guide pipes are filled with lubricant.

5. The two dimensional drive system according to claim 1, wherein each end of each said guide pipe is detachably connected to said corner block.

6. The two dimensional drive system according to claim 1, wherein said first turning means or said second turning means is detachably attached at each end of each said connecting shaft.

7. The two dimensional drive system according to claim 1, wherein spaces for accommodating said first turning means and said second turning means are engraved in each said corner block.

8. The two dimensional drive system according to claim 1, wherein said first looped members and said second looped members are timing belts.

9. The two dimensional drive system according to claim 8, wherein said first turning means and said second turning means are timing pulleys, which are capable of engaging with said timing belts.

10. The two dimensional drive system of claim 1, wherein said guide pipes and corner blocks provide for substantially the total structural support for the system.

11. The two dimensional drive system according to claim 1, further including means for detachably connecting each of said guide pipes to one of said corner block;

wherein each connecting shaft extends beyond the open end of each guide pipe and extends into each corner block.

12. The two dimensional driving system according to claim 1, wherein said turning means are located inwardly from an outer surface of said corner blocks so that said outer surface defines the exterior surface of said system.

* * * * *